June 14, 1927.
L. N. HAMPTON
CLEARANCE GAUGE
Filed Dec. 15, 1922
1,632,067
2 Sheets-Sheet 1
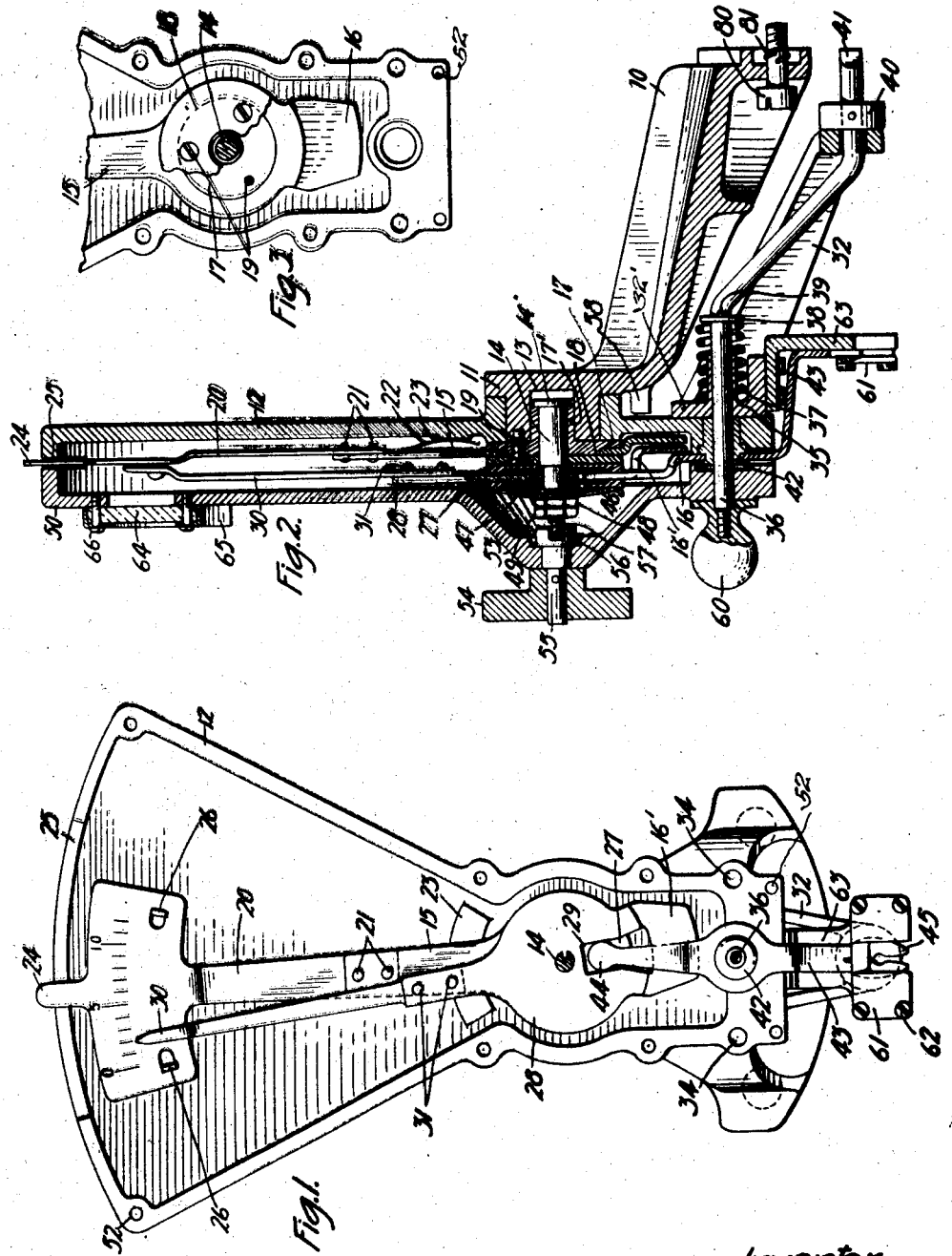
Inventor:
Leon N. Hampton
by Joel Ch. Parmes Atty.

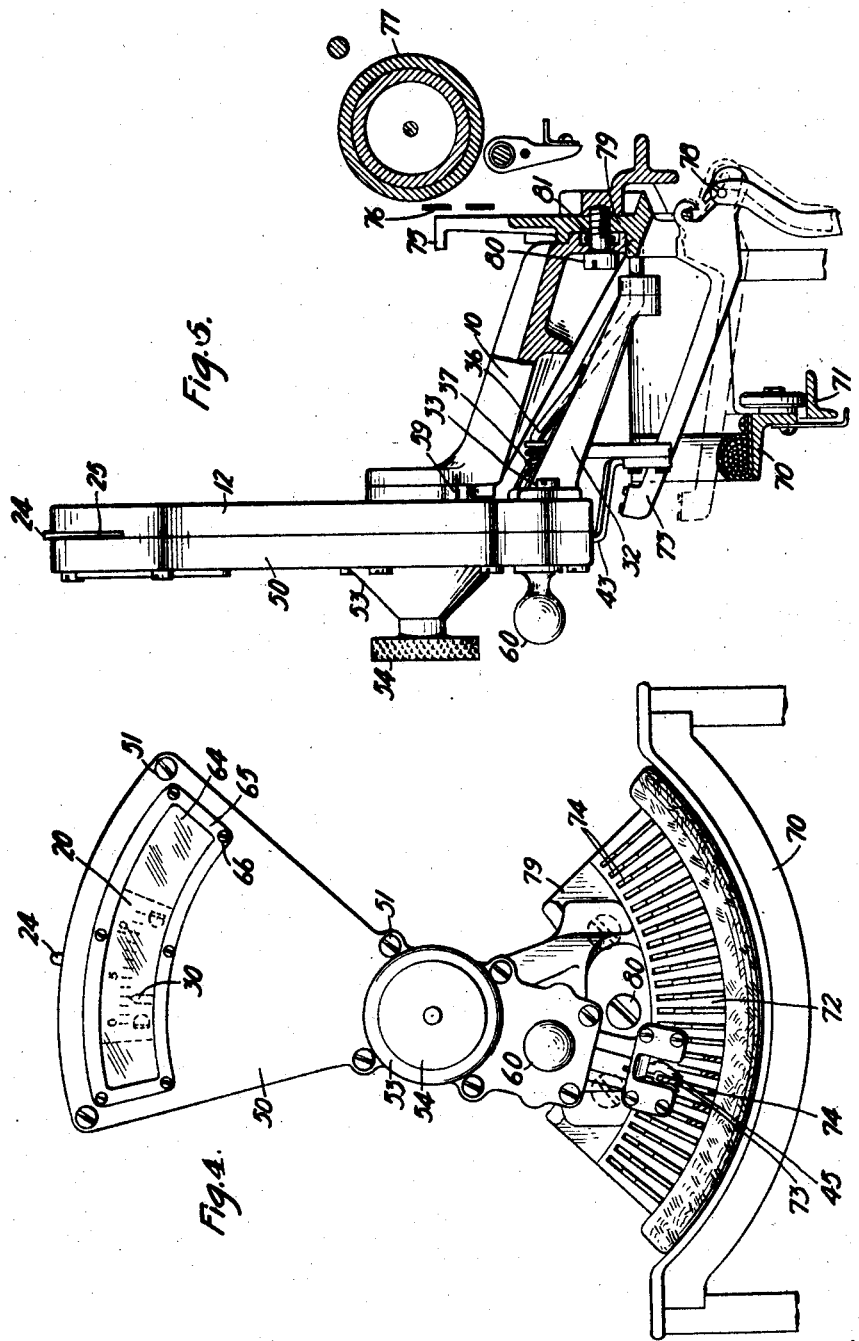

Patented June 14, 1927.

1,632,067

UNITED STATES PATENT OFFICE.

LEON N. HAMPTON, OF NEW YORK, N. Y., ASSIGNOR TO WESTERN ELECTRIC COMPANY, INCORPORATED, OF NEW YORK, N. Y., A CORPORATION OF NEW YORK.

CLEARANCE GAUGE.

Application filed December 15, 1922. Serial No. 607,110.

This invention relates to clearance gauges and particularly to gauges for measuring the clearance of type bars of typewriters, printing telegraph apparatus and similar mechanisms.

As is well known, the type bars of typewriters, printing telegraph recorders and similar devices frequently become loosened either through improper adjustment or constant usage. Loose or bent type bars frequently strike one another in the operation of the machine particularly, as in the case of the printing telegraph recorder, when the device is required to operate at a high speed. It is especially desirable that the type bars in such recorders be properly adjusted since they are frequently run for long periods of time in the absence of an attendant, and consequently a single improperly adjusted bar may render the entire machine inoperative until the fault is discovered. The present invention provides a means for accurately measuring the clearance between such type bars and their respective bearing slots in order that the faulty bars may be adjusted or replaced.

It is an object of the invention to provide a new and improved clearance gauge which is simple in construction, easily adjustable, and simple and accurate in operation.

The invention in its preferred form consists of a bracket upon which is pivoted a housing containing a scale and associated measuring mechanisms. The bracket is adapted to be fastened to the frame of the typewriter or printer to be tested, by adjusting a single screw, the pivoted housing then being swung to a position for testing any type bar in the type basket.

Other features and advantages of the invention will appear from a consideration of the following specification taken in connection with accompanying drawings in which;

Fig. 1 is a front elevation showing the invention in its preferred form, the cover and certain parts being removed to permit the illustration of the scale and associated mechanisms.

Fig. 2 is a side sectional view with the cover in position.

Fig. 3 is a fragmentary elevation showing the mounting of the scale.

Fig. 4 is a front elevation showing the gauge mounted in position on the frame of a printing telegraph recorder, certain of the type bars being shown in section.

Fig. 5 is a side elevation thereof, certain parts of the recorder being shown in section.

Referring to the drawings, in its preferred form the invention comprises a bracket 10 having a smooth bearing surface 11 upon which is pivoted a fan-shaped dished plate or housing 12. For the sake of cheapness and simplicity in construction, the bracket 10 and the plate 12 are preferably of cast metal, although any other suitable material may be employed. A counter-boring 13 is provided within the bearing 11 to receive the headed portion of a bearing stud 14 which is threaded on its outer end. A scale arm 15, provided on its lower end with a counter-weight extension 16, is clamped between a pair of metal washers 17 and 18 which are secured to the bracket 10 by means of screws 19. The washer 17 is provided on one side with an extension 17′ which extends into the counter-boring 13 and serves as a bearing for the stud 14. The washer 17 is also flanged on its opposite side to provide a bearing for the scale arm 15. The scale 15 may be of any suitable material, but it is desirable that its upper portion be light in weight in order that it will not bear to one side, but will remain in any angular position to which it may be moved. For this reason, the upper portion 20 of the scale arm is constructed of aluminum and is fixed to the lower portion 15 by means of studs 21. Any tendency of the long scale arm to bear to one side will be overcome by the light aluminum tip 20 and the lower counter-weight 16. A brake is also provided to assist in retaining the scale arm in any position to which it is moved, this brake consisting of a spring member 22 which is clamped between the ends of the arm portions 15 and 20 by means of studs 21 and is adapted to engage the raised surface 23 of the housing 12. The scale arm is provided at its top end with a projecting tab 24 formed integral therewith and adapted to move within a slotted portion 25 on the edge of the housing 12. It will be seen that the movement of the scale arm is limited in either direction by the engagement of the tab 24 with the edge of the slot 25. The exact length of slot 25 is not important so long as it is sufficient to permit the scale arm to sweep over a fairly wide arc. The top of the scale arm is provided with a scale suitably calibrated to indicate the clearance of the type bars to be tested, and a punched-out tab 26 is provided at each end thereof to limit the movement of an indicating pointer. A metal washer 27 is mounted on the bearing stud 14 and is keyed to rotate therewith. The pointer 28 is pivoted upon the stud 14 and frictionally engages the washer 27. The pointer 28 is slotted or forked at 29 to provide a connection for rotating the pointer, as hereinafter described. As in the case of the scale arm, the pointer 28 is provided with a counterweight 16′, and an aluminum upper portion 30, connected to the lower portion of the pointer by means of studs 31. It will be obvious that the pointer 28 may be moved on the pivot stud 14 until the tip 30 engages the punched tab 26 on either end of the scale arm.

The fan-shaped housing 12 is provided with a backwardly and downwardly extending arm 32 which may be made integral therewith or, as shown in the drawings, may be attached thereto by means of screws 33 fastened in screw holes 34. The arm 32 is provided with an extension 35 which acts as a bearing for a plunger rod 36. A coil spring 37 around the extension 35 is disposed between the upper part 32′ of arm 32 and a stop comprising a washer 38 and a pin 39 on the rod 36 to force the rod backward, the end of the rod acting in a bearing 40 mounted on the end of the arm 32. It will be evident that the limit to which the arm 36 may be drawn against the tension of spring 37 will be defined by the engagement of the stop washer 38 with the bearing extension 35. The tip 41 of the rod 36 is sharpened almost to a knife edge to permit it to be readily inserted into the narrow bearing slot in which each type bar of a printing telegraph recorder or typewriter rests. A bearing bushing 42 of an angular lever arm 43 is pivotally mounted in a bearing slot in the housing 12 which is substantially in alignment with the bearing 35. The plunger rod 36 which passes through the bearing 35, also passes through a clearance hole in the bushing 42. The lever arm 43 is provided on its upper end with a rounded tip 44 which rests in the forked slot 29 of the pointer 28 riding free between the washers 27 and 46; and is provided at its lower end with a bifurcated tip 45. It will be seen that the forked slot 29 of the pointer 28 and the rounded tip 44 of the lever arm 43 form a differential connection and that any lateral force exerted on the bifurcated tip 45 of the lever arm will be communicated to the pointer 28 to cause the aluminum tip 30 thereof to be swung in the same direction as the applied force.

A metal washer 46 is keyed to the stud 14, covering the slot 29 and the rounded tip 44, as shown in Fig. 2. Above the washer 46 and on the stud 14 is a spring washer 47, of brass or other suitable material adapted to exert an even pressure about the rim of washer 46 when pressure is applied to the center of the washer 47 by means of adjustable nuts 48 and 49 on the stud 14.

It will be apparent that a rotatable motion applied to the free end of the bearing stud 14 will cause the pointer 28 to rotate therewith, since the pointer is frictionally clamped between washers 27 and 46 which are keyed to the stud 14. This connection forms a very effective friction drive for the pointer which may be rotated at will so long as the lever arm 43 is free. It is obvious by referring to Fig. 1, however, that when the lever arm 43 is held immovable, as by inserting a fixed rigid bar of metal in the bifurcated end 45, the pointer 28 will likewise be held immovable by the rounded tip 44 of the lever arm which is in engagement with the forked slot 29 of the pointer, while the friction washers 27 and 46, being keyed to the bolt 14, will rotate as before.

A cover 50, having a dished edge similar to the edge of the housing 12, is held in place by means of screws 51 which engage screw-holes 52 in the edge of housing. The cover 50 is formed with a cone-shaped portion 53 which encloses the frictional driving mechanisms of the pointer 28 when the cover is in place. A knob 54 having a knurled edge is keyed to a shaft 55 which passes through the cone-shaped portion 53 substantially in alignment with the bearing stud 14 a slot 56 in the end thereof being adapted to receive the flattened edge 57 of the stud 14 when the cover 50 is mounted in position. As pointed out above, when the bracket 10 is mounted on a suitable support, the housing 12 and the mechanisms supported thereby may be swung to the right or left as desired, its movement in either direction being limited by a projection tab 58 on the bracket which is adapted to engage with projecting tabs 59 formed on each side of the housing 12. When the cover 50 is fastened in place on the housing 12, a small internally threaded knob 60 is screwed on the threaded end of the plunger rod 36. This knob serves as a means for drawing the plunger rod forward against the tension of the coil spring 37 to permit the insertion of the knife edge 41 into a receptive member as hereinafter more fully described. The knob 60 also serves to limit the distance to which plunger rod 36 is normally forced toward the bearing 40 by the spring 37. The bifurcated end 45 of the lever arm 43 is preferably protected from possible external jars by a recessed plate 61 which is mounted by means of screws 62 on a small bracket 63 depending from the arm 32. In order that the scale may be readily observed when the cover is in place, a small arcuate window 64, supported in a frame 65, is mounted on the cover 50 in alignment with the scale by means of screws 66.

Referring particularly to Figs. 4 and 5, the gauge is shown mounted in position for measuring the clearance of the type bars of a printing telegraph recorder, only so much of the recorder being shown as is necessary to a complete understanding of the invention. The type carriage 70 of the recorder is mounted on the usual track 71. The type basket 72 includes a number of type bars such as 73 which are disposed in arcuately arranged slots 74 and which may be raised to a type guide 75 to impress the ribbon 76 against the platen 77. It frequently happens that some of the bars 73 become loosened at their pivot points 78 or become bent or warped in such a way as to render them out of alignment. A faulty type bar will wobble or incline to one side, causing it to strike an adjacent type bar during the operation of the printer. This is particularly so when the machine is operated at a high speed where several type bars are simultaneously in a suspended position, a rising bar frequently passing a falling bar by a very small fraction of an inch even when the bars are properly adjusted. In order to ascertain which type bars are so faulty as to require adjustment or replacement, the bracket 10 of the clearance gauge is mounted on the recorder or typewriter frame 79, the curved edge of the bracket fitting into the usual curved portion of the frame directly above the type basket, and being firmly secured in place by a single screw 80 which engages a tapped hole in the frame 79 which may, if necessary, be specially provided for the purpose. The screw 80 is prevented from falling out of the frame 10 when the device is not in use by means of ring 81. When the bracket is mounted on the frame 79 the housing of the gauge may be swung through the entire arc of the type basket to test any type bar therein. Each type bar is tested separately. For example, if the type bar 73 is to be tested, the knife edge 41 is withdrawn from engagement with the slot 74, in which is may be resting, by pulling on the knob 60 and the housing of the gauge is then swung to a position where the knife edge 41 of the plunger rod 36 is adjacent the particular slot 74 in which the type bar 73 rests. The knob 60 is then released and the spring 37 forces the knife edge 41 into the slot 74. The engagement of the knife edge 41 with the slot 74 prevents the gauge from moving during the testing operation. The type bar 73 is raised and inserted in the bifurcated end 45 of the lever arm 43. The knurled knob 54 is then rotated in either direction, for example to the left, until the end 30 of the pointer has been moved as far as it will go. When the pointer has reached the maximum point of its travel, it will simply slip in its friction connection, allowing the knob 54 to be rotated at will without further moving the pointer. It will be seen that the movement of the pointer to the left is controlled by the type bar 73 which firmly holds the lever arm 43 against further movement. When the pointer has reached its maximum point of travel in one direction, in this case to the left, the scale arm is moved by means of the projecting tab 24 until the zero mark is opposite the pointer. When this condition prevails, the knob 54 is rotated to the right, frictionally moving the pointer which carries with it the lever arm 43 and consequently moving the type bar 73 which is caught in the bifurcated tip 45. When the type bar 73 becomes taut or rigid, having reached the maximum of its lateral movement, the lever arm 43 will be held rigid, preventing further movement of the pointer, and allowing the friction washers 27 and 46 to continue to rotate with the knob 54 without further moving the pointer. The point on the scale at which the pointer then rests indicates the distance through which the type bar 73 is movable laterally, or, in other words, the clearance of the type bar. If this distance proves to be more than the maximum allowable clearance which varies with different types of machines, this type bar should be adjusted or replaced. After testing any type bar, the knife edge 41 may be withdrawn from the slot 74 by means of the knob 60, and the housing of the gauge may be swung in either direction to test another bar.

Certain changes involving the materials and details of construction herein described may obviously be made without departing from the scope and spirit of the invention which, therefore, is not limited except as defined by the appended claims.

The invention claimed is:

1. A gauge of the character described comprising a scale, an indicating member associated therewith, means for adjusting said member with respect to said scale, and means actuated by the device to be tested for limiting the adjustment of said member.

2. A gauge of the character described, comprising a supporting member, a scale associated therewith, an indicating member pivoted adjacent said scale, a lever for limiting the movement of said indicating member, and a member frictionally connected with said indicating member for moving it, the amount of motion of said indicating member depending on the amount of motion of said lever.

3. A gauge of the character described, comprising a supporting member, a scale associated therewith, an indicating member pivoted adjacent said scale, said indicating member having a forked portion at one end, a member having an end extending into said forked portion to control the movement of said indicating member, and frictional means for moving said indicating member.

4. A gauge of the character described, comprising a supporting member, a scale associated therewith, a bearing supporting a pointer adjacent said scale, a pair of washers keyed to said bearing, said pointer being clamped between said pair of washers, means for holding said washers in frictional engagement with said pointer whereby said pointer may normally be rotated by said shaft, a forked portion in said pointer, and a lever having an end extending into said forked portion to hold said pointer against movement by said frictional connection.

5. A clearance gauge for typewriters and similar devices, comprising a support adapted to be mounted on the typewriter frame, a scale pivotally associated with said support, a pointer associated with said scale, a lever having means for receiving the end of any type bar in the device on test, a sliding connection between said pointer and lever for moving said pointer in the direction of the tension of the type bar on test, and means for moving said pointer within a range limited by the play in such type bar.

6. A clearance gauge for typewriters and similar devices, comprising a support adapted to be mounted on the typewriter frame, a housing pivotally mounted on said support, a scale pivotally mounted in said housing, a pointer associated with said scale, means for retaining said housing in any angular position to which it may be moved, a lever having means for receiving the end of any type bar in the device on test, a sliding connection between said pointer and lever for moving said pointer in the direction of the tension of the type bar on test, and means for moving said pointer within a range limited by the play in such type bar.

7. A clearance gauge for typewriters and similar devices, comprising a support adapted to be mounted on the typewriter frame, a housing pivoted upon said support, a scale pivotally mounted in said housing, a pointer associated with said scale, a plunger rod mounted on said housing and adapted to be inserted in the bearing slot of any type bar in the type basket of the device on test to rigidly support said housing during the testing operation, a lever having a slotted end adapted to receive the end of any type bar in the type basket, a sliding connection between said pointer and lever for moving said pointer in the direction of the normal tension of the type bar on test, and an operating knob frictionally connected with said pointer for moving it within a range limited by the play in such type bar.

In witness whereof, I hereunto subscribe my name this 8th day of December, A. D. 1922.

LEON N. HAMPTON.